United States Patent
Labianca

(10) Patent No.: US 12,522,314 B2
(45) Date of Patent: Jan. 13, 2026

(54) PASSIVE SAFETY DEVICE FOR A MOTORCYCLE

(71) Applicant: ELLEA INGEGNERIA SRL UNIPERSONALE, Bari (IT)

(72) Inventor: Alfredo Labianca, Turin (IT)

(73) Assignee: ELLEA INGEGNERIA SRL UNIPERSONALE (IT)

( * ) Notice: Subject to any disclaimer, the term of this patent is extended or adjusted under 35 U.S.C. 154(b) by 72 days.

(21) Appl. No.: 18/741,932

(22) Filed: Jun. 13, 2024

(65) Prior Publication Data

US 2024/0417021 A1    Dec. 19, 2024

(30) Foreign Application Priority Data

Jun. 16, 2023  (IT) .................. 102023000012408

(51) Int. Cl.
 *B62J 50/22*  (2020.01)
 *B60C 23/20*  (2006.01)
 *B62J 45/415* (2020.01)

(52) U.S. Cl.
 CPC ............. *B62J 50/22* (2020.02); *B60C 23/20* (2013.01); *B62J 45/4151* (2020.02)

(58) Field of Classification Search
 None
 See application file for complete search history.

(56) References Cited

U.S. PATENT DOCUMENTS

| | | | |
|---|---|---|---|
| 2005/0212254 A1* | 9/2005 | Heitner | B62H 1/10 |
| | | | 280/298 |
| 2009/0103319 A1* | 4/2009 | Peeters | B60T 8/172 |
| | | | 362/465 |
| 2014/0372074 A1* | 12/2014 | Dribinsky | G01C 9/06 |
| | | | 702/154 |

(Continued)

FOREIGN PATENT DOCUMENTS

| | | |
|---|---|---|
| DE | 102014112574 A1 | 3/2016 |
| DE | 102015121443 A1 | 7/2016 |

(Continued)

OTHER PUBLICATIONS

International Search Report and Written Opinion dated Jun. 16, 2023, issued by the Ministry of Business and Made in Italy, 9 pages.

*Primary Examiner* — Daniel L Greene
(74) *Attorney, Agent, or Firm* — Thompson Patent Law Offices PC

(57) ABSTRACT

A passive safety device (1) for a motorcycle (100) comprises a gyroscope (16) configured to be engaged with a portion of the motorcycle (100) and to measure a lean angle assumed by the motorcycle (100), a microprocessor (14), and a display (22) connected to the microprocessor (14). The safety device (1) further comprises an infrared sensor (30) connected to the microprocessor (14) and configured to measure a temperature value of a tyre (102) of the motorcycle (100), the microprocessor (14) being configured to determine one or more safety lean angle values of the motorcycle (100) according to the measured temperature (Continued)

value of the tyre (102), and to display on the display (22) the measured lean angle assumed by the motorcycle (100) and the determined one or more safety lean angle values of the motorcycle (100).

9 Claims, 8 Drawing Sheets

(56) References Cited

U.S. PATENT DOCUMENTS

| | | | | |
|---|---|---|---|---|
| 2015/0364061 A1* | 12/2015 | Kurosawa | ............. | G09B 9/058 |
| | | | | 434/61 |
| 2017/0008591 A1* | 1/2017 | Abbott | ............. | B62K 5/08 |
| 2017/0101081 A1* | 4/2017 | Meier | ............. | B60T 8/1766 |
| 2018/0265059 A1* | 9/2018 | D' Addetta | ..... | B60W 30/18145 |
| 2020/0339144 A1* | 10/2020 | Oshida | ............. | B62J 27/00 |
| 2021/0181737 A1* | 6/2021 | Patnaik | ............. | B60C 23/06 |
| 2021/0221368 A1* | 7/2021 | Lavi | ............. | G06V 20/56 |
| 2021/0319535 A1* | 10/2021 | Tokunaga | ............. | G06F 3/14 |
| 2022/0083790 A1 | 3/2022 | Samona et al. | | |
| 2023/0088275 A1* | 3/2023 | Weiss | ............. | B62D 9/02 |
| | | | | 280/124.103 |
| 2023/0256778 A1* | 8/2023 | Wei | ............. | B60C 11/246 |
| | | | | 701/29.4 |
| 2024/0182129 A1* | 6/2024 | Venkata Jagannadha Rao | ........... | |
| | | | | B62J 45/412 |

FOREIGN PATENT DOCUMENTS

| | | | | |
|---|---|---|---|---|
| DE | 102020118310 A1 | | 1/2022 | |
| EP | 3475152 A1 | | 5/2019 | |
| IN | 201200582 I4 | * | 8/2013 | |
| IT | 10202300012408 | | 6/2023 | |
| JP | 2019038495 A | * | 3/2019 | ............. B62J 50/22 |
| WO | 2013117275 A1 | | 8/2013 | |
| WO | WO-2022038621 A1 | * | 2/2022 | ........... B60K 35/214 |
| WO | WO-2023152758 A1 | * | 8/2023 | ........... B62J 45/4151 |

* cited by examiner

| | | |
|---|---|---|
| | S1 | 0° – 15° |
| | S2 | 16° – 30° |
| | S3 | 31° – 40° |
| | S4 | 41° – 45° |
| | S5 | 46° – 50° |
| | S6 | 51° – 55° |
| | S7 | 56° – 60° |
| | S8 | > 60° |

PASSIVE SAFETY DEVICE FOR A MOTORCYCLE

CROSS-REFERENCE TO RELATED APPLICATIONS

This application is a U.S. national entry application and claims the benefit of Italian Application Serial No. 102023000012408, titled "Passive Safety Device for a Motorcycle," filed by Ellea Ingregneria SRL Unipersonale on Jun. 16, 2023.

This application incorporates the entire contents of the foregoing application herein by reference.

TECHNICAL FIELD

Various embodiments relate generally to the sector of passive safety devices for vehicles.

BACKGROUND

When a motorcycle has to negotiate a bend, usually the motorcyclist inclines the vehicle body towards the side of the bend which is to be negotiated in order to counteract the centrifugal force. The optimum lean angle of the motorcycle depends on the radius of bend which must be negotiated, the mass and the speed of the motorcycle. If the motorcyclist does take into account all these factors and/or causes the motorcycle to lean at an incorrect angle, it is highly likely that he/she will suffer a fall.

SUMMARY

Apparatus and associated methods relate to a passive safety device (1) for a motorcycle (100) comprises a gyroscope (16) configured to be engaged with a portion of the motorcycle (100) and to measure a lean angle assumed by the motorcycle (100), a microprocessor (14), and a display (22) connected to the microprocessor (14). The safety device (1) further comprises an infrared sensor (30) connected to the microprocessor (14) and configured to measure a temperature value of a tyre (102) of the motorcycle (100), the microprocessor (14) being configured to determine one or more safety lean angle values of the motorcycle (100) according to the measured temperature value of the tyre (102), and to display on the display (22) the measured lean angle assumed by the motorcycle (100) and the determined one or more safety lean angle values of the motorcycle (100).

The invention has been developed with particular regard, even through not exclusively, to a safety device for a motorcycle able to assist a motorcyclist when negotiating a bend and, even more particularly, to a portable adaptive inclinometer.

Although the solutions of the prior art are effective, the variables which may contribute towards causing a motorcyclist to fall when negotiating a bend are many, and each of the solutions of the prior art has certain drawbacks.

The general object of the present invention is to integrate a number of essential parameters which can be used to generate in real time a performance model of the riding dynamics, thereby attempting to overcome said drawbacks, and to provide a safety device which allows a motorcyclist to avoid more effectively the risk of a fall.

Another object of the present invention is to provide a safety device which can be easily installed and immediately used, without having to modify or be physically connected to a pre-existing electronic control circuit of the motorcycle.

In view of this object, the Proprietor has had the idea of providing, according to the invention, a safety device as defined in claim 1.

The dependent claims define further innovative characteristic features of the present invention.

Further characteristic features and advantages of the present invention will become clearer from the description given below.

The details of various embodiments are set forth in the accompanying drawings and the description below. Other features and advantages will be apparent from the description and drawings, and from the claims.

Figure 1:
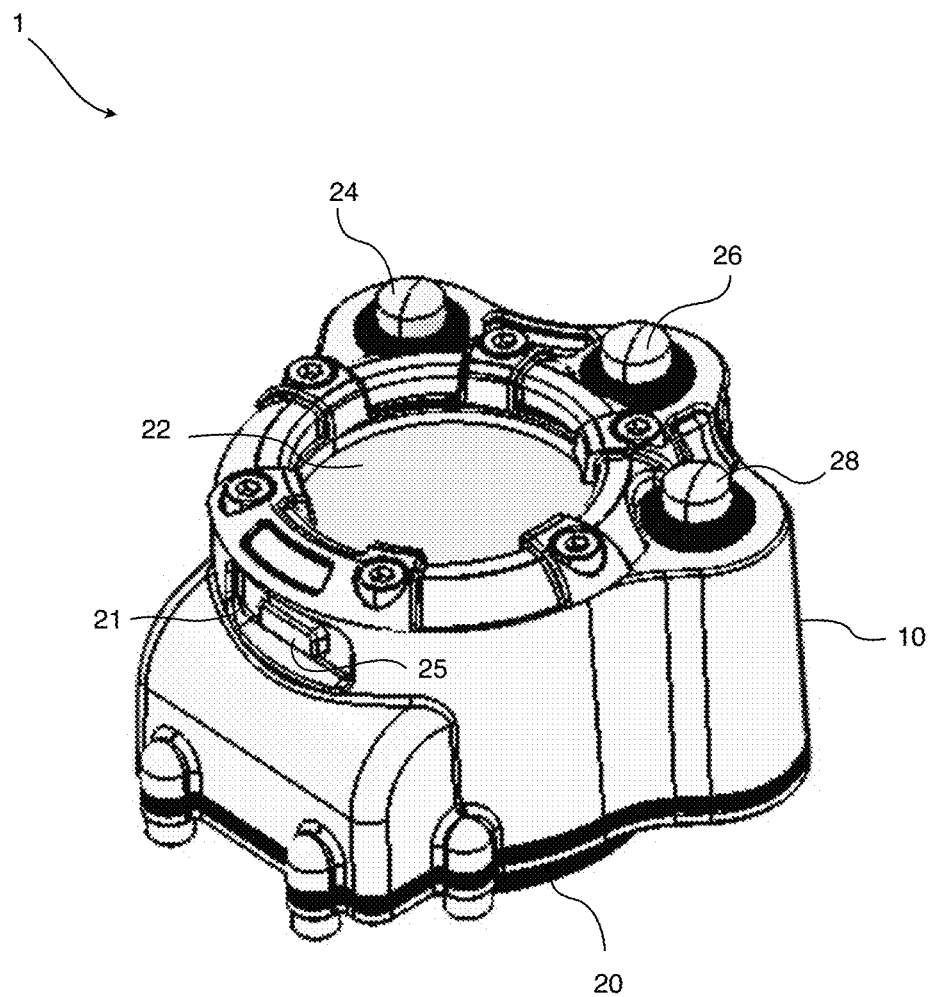
FIG. 1 is an axonometric view of a safety device according to the present invention.
Figure 2:
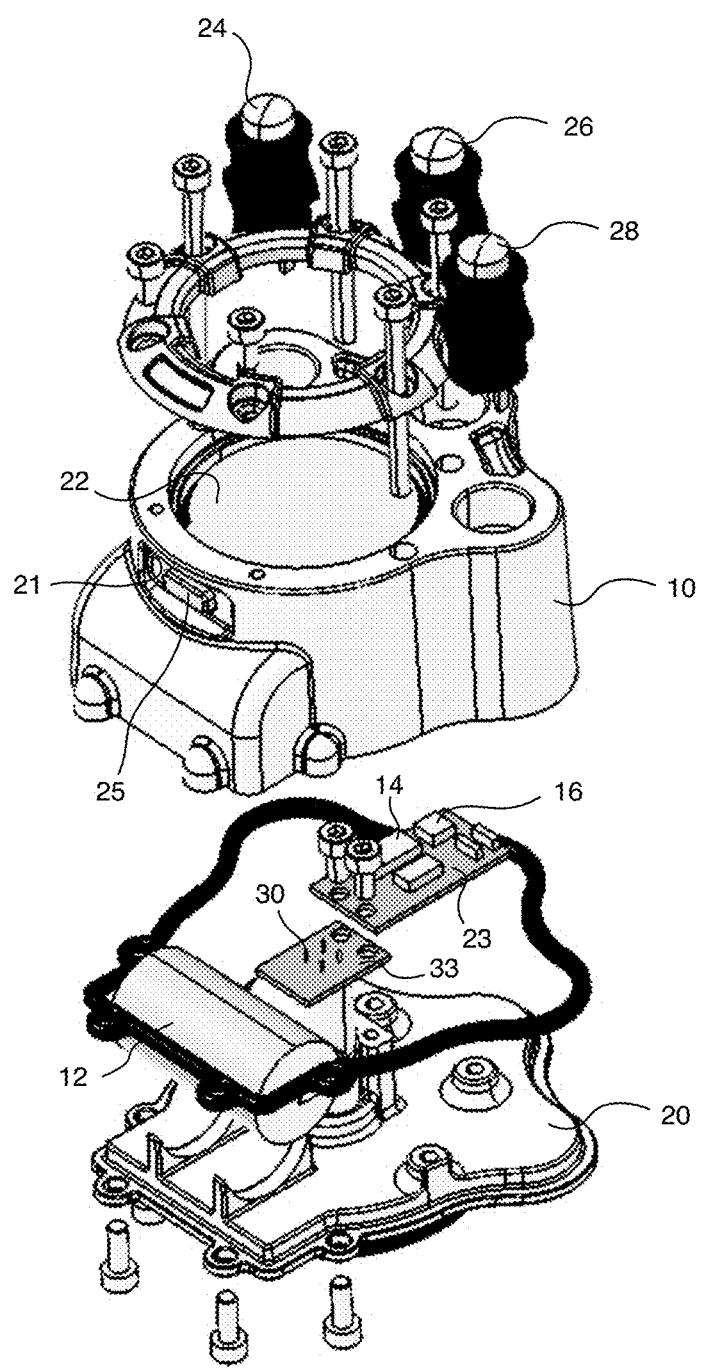
FIG. 2 is an exploded view of the device shown in FIG. 1.

In order to facilitate understanding, identical reference numbers have been used, where possible, to identify identical common elements in the figures. It is understood that elements or characteristics of one embodiment may be conveniently incorporated in other embodiments without further clarifications.

DETAILED DESCRIPTION OF ILLUSTRATIVE EMBODIMENTS

Each example is provided merely by way of illustration of the invention and is understood as not being a limitation thereof. For example, the technical characteristics shown or described since they form part of one embodiment may be integrated within, or associated with, other embodiments in order to produce a further embodiment. It is understood that the present invention will be inclusive of these modifications and variants.

It is understood that elements or characteristics of one embodiment may be conveniently incorporated in other embodiments without further clarifications.

With reference to the attached figures, a safety device for a motorcycle, denoted overall by the number 1, comprises a microprocessor 14 and an instrument for measuring the inclination of a body, for example an inclinometer, more preferably a gyroscope 16, more preferably a gyroscope with an inertial measurement unit (IMU). The gyroscope 16 is connected to the microprocessor 14, and both the gyroscope 16 and the microprocessor 14 are configured to be connected to an electric power supply, preferably a battery 12. In the embodiment illustrated, the safety device 1 also includes the battery 12, but in other embodiments the electric power supply may be independent of the safety device 1, e.g. the electric power supply could be included in the motorcycle.

In the embodiment shown, the microprocessor 14 and the IMU gyroscope 16 are implemented directly on an electronic circuit, for example a printed electronic circuit (PCB) 23, and the safety device 1 comprises a battery 12 to which the electronic circuit 23 is connected.

The safety device 1 also comprises a display 22, connected to the printed electronic circuit 23 and configured to be connected to the battery 12.

According to the embodiment shown in the figures, the safety device 1 comprises a container 10 which defines internally an empty space, and a closing element 20, which is selectively engaged with the container 10. The display 22 is preferably arranged inside the container 10, facing an opening formed on the top portion of the container 10, so as to be visible from the outside.

The safety device 1 may further comprise a plurality of functional keys 24, 26, 28 arranged, for example, in the top portion of the container 10 and connected to the microprocessor 14 of the printed electronic circuit 23.

According to one of the embodiments of the present invention, the safety device 1 also comprises a connection port 25 for supplying the battery 12 and/or for transmitting data to and from the microprocessor 14. For example, a USB port 25 is connected to the printed circuit 23 and the front portion of the container 10 comprises a through-opening 21 for allowing access to the USB port 25 from the outside of the safety device 1.

According to a particularly advantageous characteristic feature of the present invention, the safety device 1 also comprises an infrared sensor 30 connected to the microprocessor 14. According to the embodiment shown in the figures, the infrared sensor 30 is implemented in a second electronic circuit, for example a second printed electronic circuit (PCB) 33, arranged inside the container 10 and connected to the first printed circuit 23.

Obviously it is possible to envisage a single printed electronic circuit (PCB) 23 in which the microprocessor 14, the gyroscope 16 and the infrared sensor 30 are implemented, as well as further electronic circuit configurations of the known type, without thereby departing from the scope of the present invention.

In use, the safety device 1 is engaged with a portion of a motorcycle 100. In particular, in embodiments where the infrared sensor 30 is disposed inside the container 10, this portion of the motorcycle 100 must be a portion facing one of the tyres 102 of the motorcycle 100, preferably facing the front tyre. For example, but not exclusively, the safety device may be removably engaged with a plate of a front fork of a motorcycle 100. The device 1 may be removably engaged in any one of the known ways, without thereby departing from the scope of the present invention.

Once positioned on the motorcycle 100, the safety device 1 is able to measure in real time the lean angle assumed by the motorcycle 100 by means of the gyroscope 16. Similarly, the safety device 1 is configured to measure in real time the thermal characteristics, for example the temperature, of the front tyre 102 of the motorcycle by means of the infrared sensor 30. All the types of telemetric data detected are sent to the microprocessor 14 of the printed circuit 23 which is configured, as will emerge more clearly below, to process said data and show said data and processing thereof on the display 22.

In particular, the microprocessor is configured to determine, in real time, a safety lean angle range (LAR) depending on the thermal conditions of the tyre 102, namely depending on the relative temperature value. By means of this safety angle range (LAR) it is possible to determine the maximum lean angle value beyond which the motorcycle 100 is very likely to lose grip on the ground when travelling around a bend.

According to an alternative embodiment of the present invention, the infrared sensor 30 is arranged on the outside of the container 10, and the safety device 1 comprises a wireless transmission and reception module, for example a Bluetooth module 40, connected to the microprocessor 14 of the printed circuit 23 and configured to receive data from the infrared sensor 30. According to this embodiment, the Bluetooth module 40 is implemented in a third electronic circuit, for example a third printed electronic circuit (PCB) 44, arranged inside the container 10 and connected to the first printed circuit 23.

In this case also it is possible to envisage a single printed electronic circuit (PCB) 23 in which the microprocessor 14, the gyroscope 16 and the infrared sensor 30, and the Bluetooth module 40 are implemented, as well as further electronic circuit configurations of the known type, without thereby departing from the scope of the present invention.

The infrared sensor 30 is engaged with a portion of the motorcycle 100, preferably a portion facing one of the tyres 102 of the motorcycle 100.

According to another alternative embodiment of the present invention, the safety device 1 comprises a first infrared sensor 30 arranged inside the container 10 and a second infrared sensor 31 arranged outside the container 10, and the safety device 1 comprises a transmission and reception module, for example a Bluetooth module 40, connected to the microprocessor of the printed circuit 23 and able to receive data from the infrared sensor arranged outside the container 10.

The safety device 1 and the second infrared sensor 31 are engaged with a respective portion of a motorcycle 100, preferably the safety device 1 is engaged with a portion facing the front tyre 102 of the motorcycle 100 and the second infrared sensor 31 is engaged with a portion facing the rear tyre 102 of the motorcycle 100.

According to further embodiments of the present invention, the safety device 1 comprises a first infrared sensor 30 and a second infrared sensor 31 both arranged outside the container 10 and the safety device 1 comprises a transmission and reception module, for example a Bluetooth module 40, connected to the microprocessor 12 of the printed circuit 23 and able to receive data from both the infrared sensors arranged outside the container 10.

The first infrared sensor 30 and the second infrared sensor 31 are engaged with a respective portion of the motorcycle 100, preferably the first infrared sensor 30 is engaged with a portion facing the front tyre 102 of the motorcycle 100, and the second infrared sensor 31 is engaged with a portion facing the rear tyre 102 of the motorcycle 100.

According to these further embodiments, the safety device 1 is configured to measure in real time the thermal characteristics, for example the temperature, of the front tyre 102 of the motorcycle 100 by means of the infrared sensor 30 and the temperature of the rear tyre 102 by means of the second infrared sensor 31 and the Bluetooth module 40.

All the data are detected, processed, and then shown on the display 22 by the microprocessor of the printed circuit 23. In particular, the temperature values of the tyre 102 detected by the sensor 30, 31 enable a range of lean angles (LARs) of the motorbike 100 to be determined, i.e. a range of lean angles (LARs) which enable the tyre 102 at the detected temperature to exert a sufficient gripping force (grip) to prevent the tyre 102 from losing grip on the ground. According to a particularly advantageous feature of the present invention, the microprocessor 14 is configured to determine a range of safe lean angles (LARs), that is, a LAR in which the grip exerted by the tyre 102 at the detected temperature is greater than the force sufficient to prevent the tyre 102 from losing grip on the ground.

The LARs is then shown on the display 22 together with a real-time display of the lean angle of the motorcycle 100 detected by the gyroscope 16. Said display system allows the motorcyclist to maintain or modify, in real time, the inclination of the motorcycle 100 so as not exceed the extremes of the LARs and, therefore, not to risk a possible fall.

Said data may be shown in the display in many different ways. One of the possible embodiments of these display systems is described below with particular reference to FIGS. 3 to 8, in which the temperatures of both tyres 102, front and rear, are detected. Obviously the description below is also applicable to the previously described embodiments in which a temperature value of only one tyre 102 is detected. A description of this situation is not provided for the sake of brevity.

Figure 3:
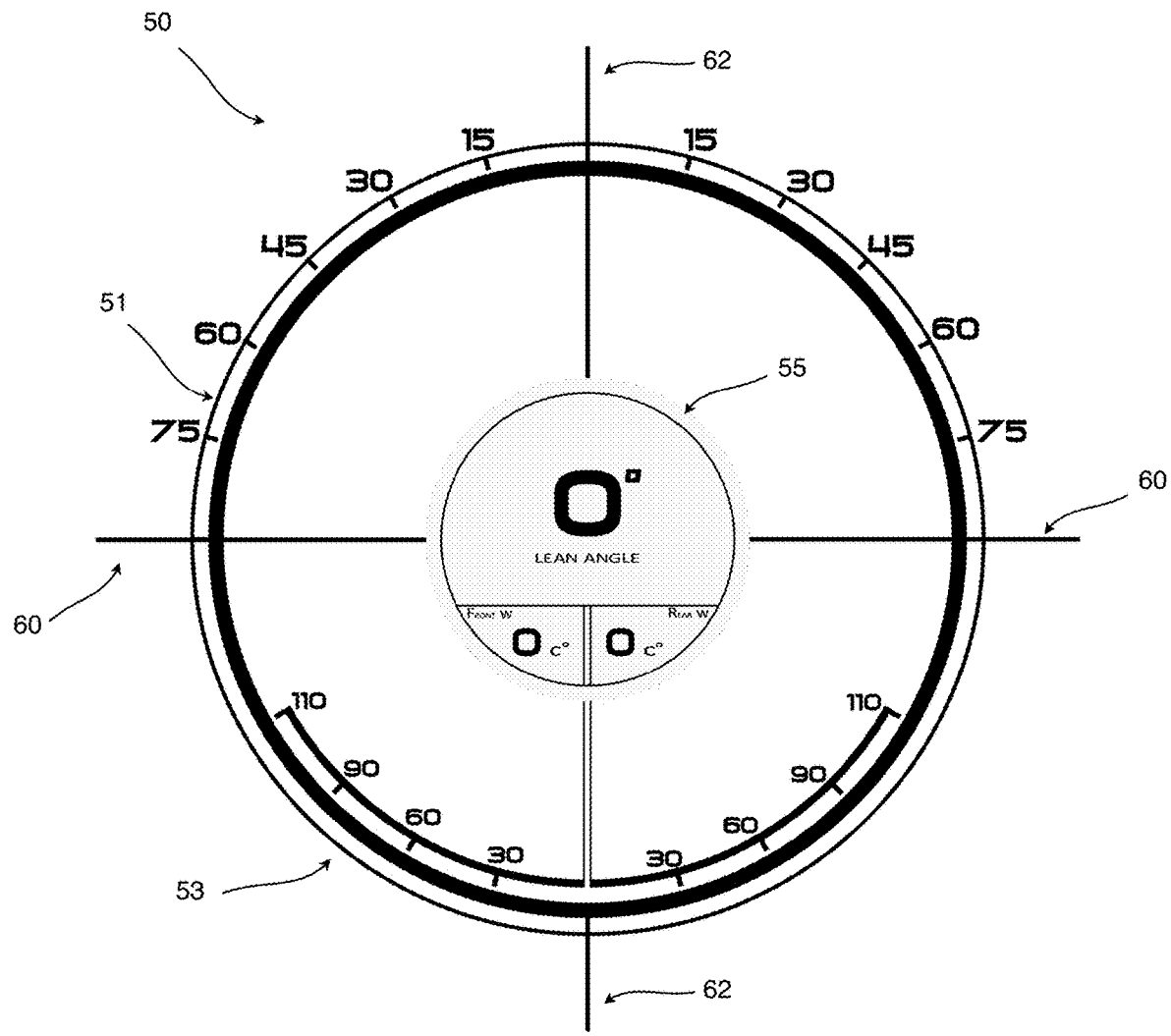
FIG. 3 is a view of the display of the device according to the present invention in a first rest condition.

FIG. 3 shows the view of the display 22 in a first rest condition in which the safety device 1 has not yet started to detect the data from the two infrared sensors 30, 31 or the gyroscope 16. The display 22 shows a graduated goniometric ring 50 which comprises two half-rings 51, 53. Lean angle values of the motorcycle 100 towards the right are shown on the right-hand portion of the upper half-ring 51 (top right-hand quadrant), while lean angle values of the motorcycle 100 towards the left are shown in the left-hand portion of the half-ring 51 (top left-hand quadrant) The bottom half-ring 53 shows temperature values of the front tyre 102 (bottom left-hand quadrant) and of the rear tyre 102 (bottom right-hand quadrant).

The central portion 55 of the display 55 shows numerical values of the data detected by the gyroscope 16 and the sensors 30, 31, namely a lean angle value and a temperature value of each tyre 102.

The display 22 also shows a pair of bars which indicate a negative artificial horizon 60 and are movable during use, and a pair of vertical bars 62 which indicate the position with lean angle value equal to zero.

Figure 4:
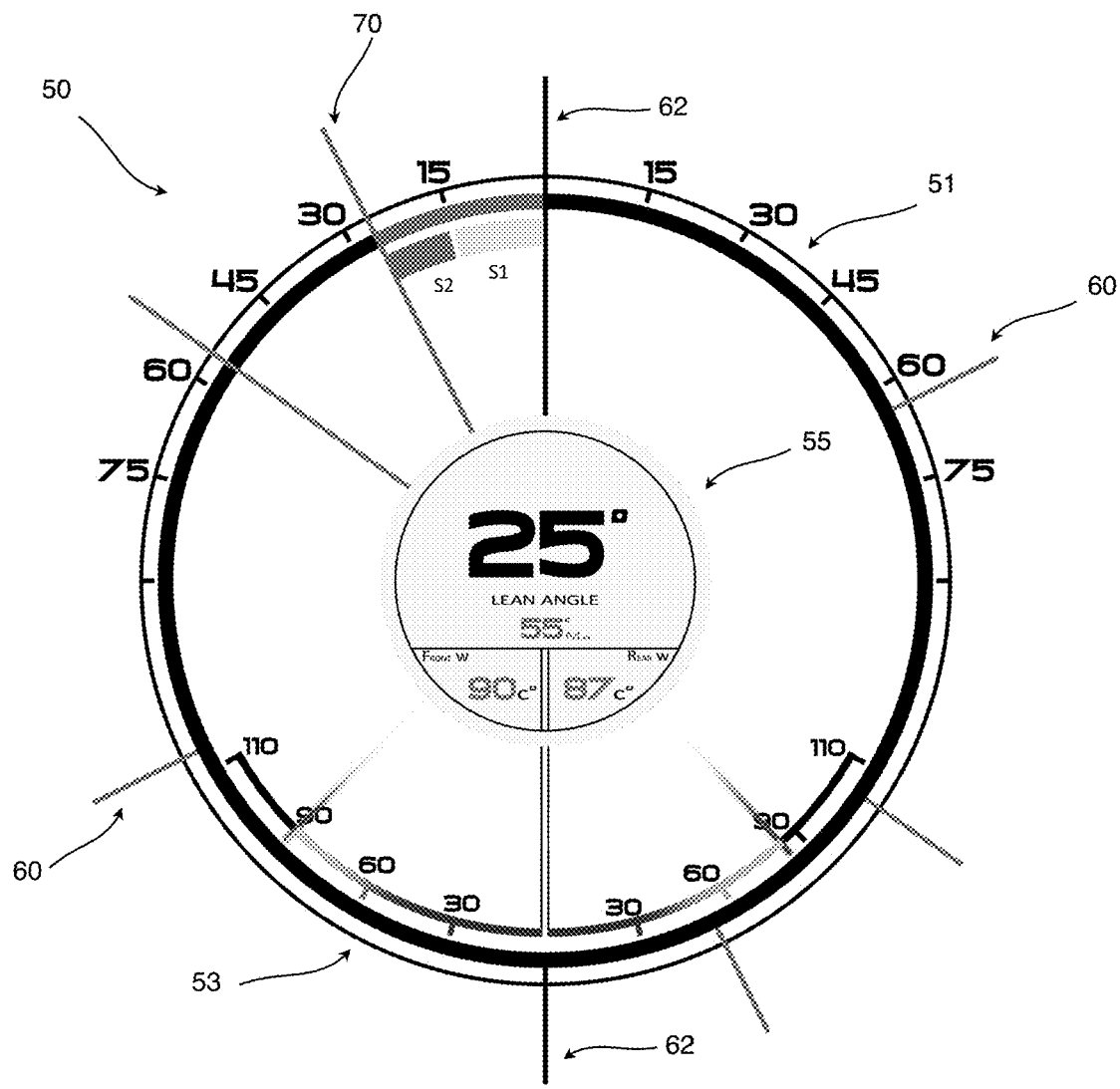
FIG. 4 is a view of the display of the device according to the present invention in a first operating condition.
Figure 5:
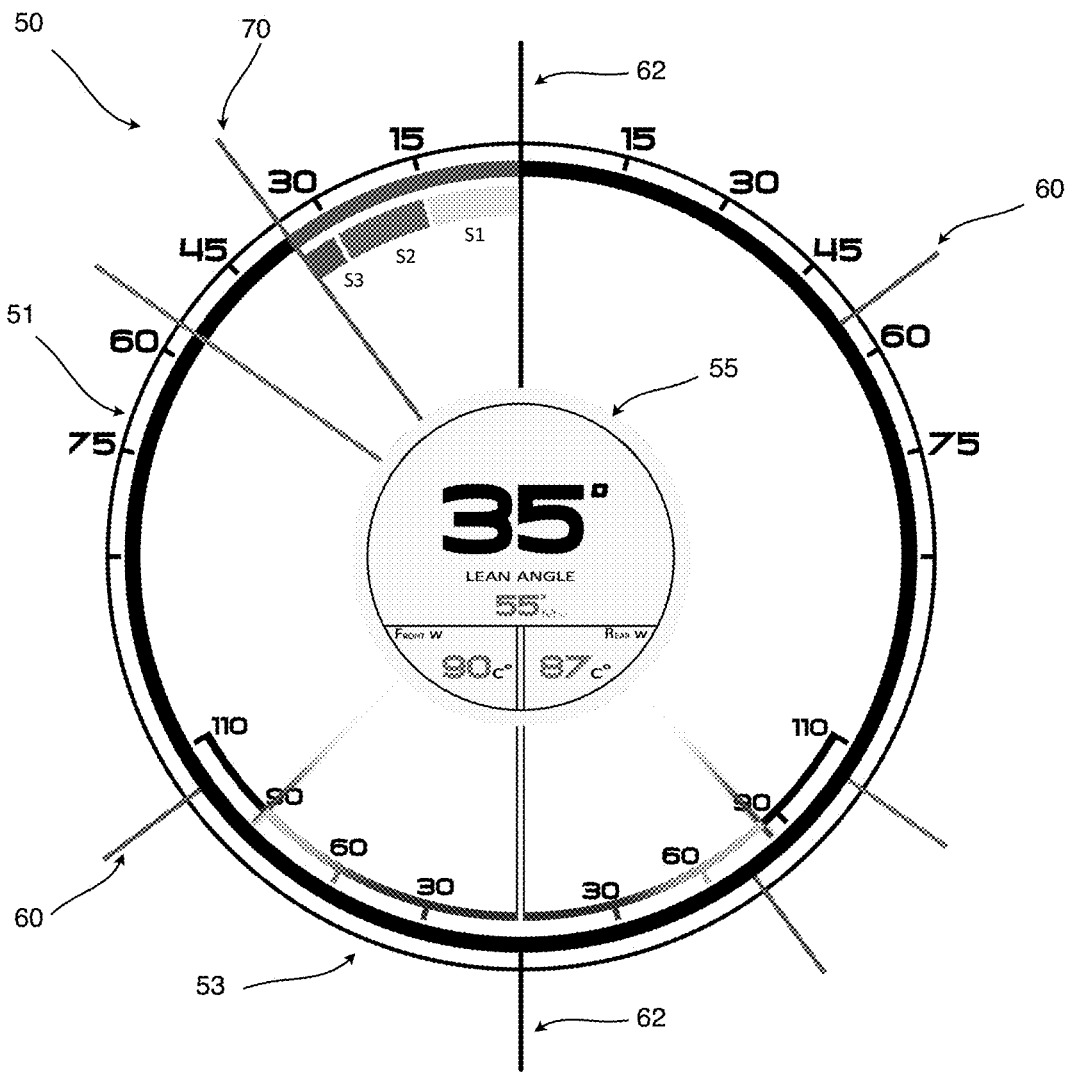
FIG. 5 is a view of the display of the device according to the present invention in a second operating condition.
Figure 6:
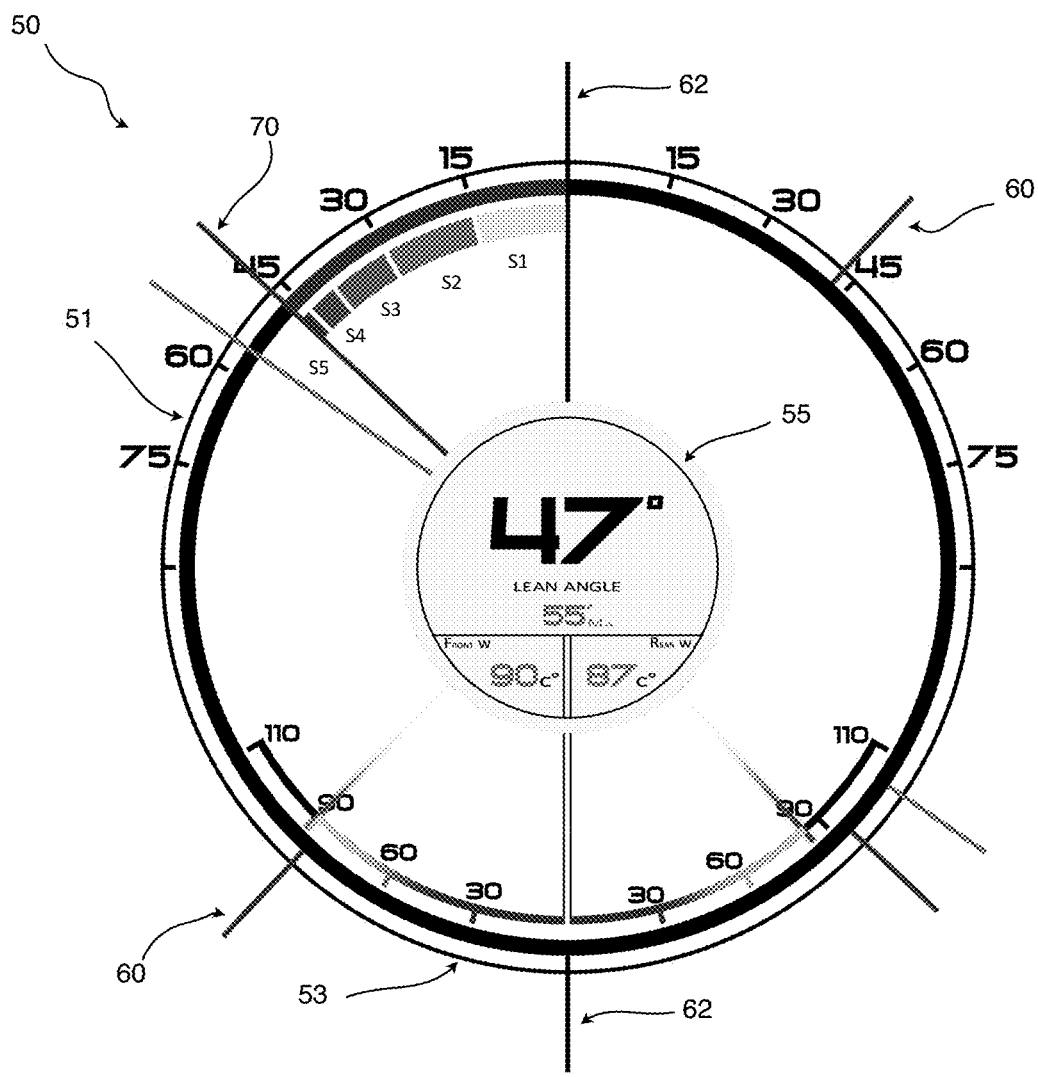
FIG. 6 is a view of the display of the device according to the present invention in a third operating condition.
Figure 6:
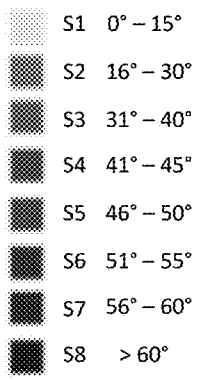

FIGS. 4 to 6 show views of the display 22 in different operating conditions where the safety device 1 has started to detect the data from the infrared sensors 30, 31 and the gyroscope 16. In particular, they show certain conditions in which the detected temperature of the tyres 102 is substantially constant, i.e. 90° C., which is an optimum temperature of the tyre, while the motorcycle is inclined to the left with three different lean angle values, 25☐, 35☐ and 47?.

As mentioned above, the microprocessor determines one or more safety lean angle ranges (LARs) depending on the thermal condition of the tyres 102. For example, for a temperature value of the tyres 102 equal to 90° C., the microprocessor determines the following lean angle ranges, and associates a safety value (Sn) with each of them:

| Temp. (° C.) | Safety Value (Sn) |
|---|---|
| 0°-15° | S1 |
| 16°-30° | S2 |
| 31°-40° | S3 |
| 41°-45° | S4 |
| 46°-50° | S5 |

-continued

| Temp. (° C.) | Safety Value (Sn) |
|---|---|
| 51-55° | S6 |
| 56°-60° | S7 |
| >60° | S9 |

The safety value Sn decreases with an increase in the value of n. Therefore S1 is a high safety value, namely the motorcycle 100 is unlikely to lose grip, while S8 indicates a minimum safety value, where the motorcycle 100 easily, if not definitely, will lose grip.

As will emerge more clearly below, if the temperature value of the tyre 102 is a value other than 90° C., different safety values Sn will be calculated with reference to a predetermined lean angle range.

These ranges are shown on the display inside the graduated goniometric ring 50 and opposite the actual lean value measured in real time.

According to a particularly advantageous characteristic feature, each safety lean angle range is shown on the display with a different colour level. For example, but not exclusively, the level S1 is represented by a white circular ring section, the level S2 by a green circular ring section, the level S3 by yellow circular ring section, the level S4 by an orange circular ring section, the level S5 by a red circular ring section, etc.

With particular reference to FIG. 4, this shows the view of the display 22 in a first operating condition, which may be called "slight left lean", where the safety device 1 detects the data from the first infrared sensor 30 and from the second infrared sensor 31 and from the gyroscope 16. The display 22 shows a needle 70 which indicates the lean angle in real time, i.e. 25°. The needle 70 defines with one of the two vertical bars 62 a circular ring segment inside which one or more different colour level sections are shown. In particular FIG. 4 shows a white circular ring section S1 and a green circular ring section S2.

From this graphical display the motorcyclist immediately understands that with the current temperature value of the tyres 102, i.e. 90° C., the current lean angle, and any other lower current lean angle value, guarantee a high degree of safety.

In the operating condition shown in FIG. 4, the position of the negative artificial horizon has changed with respect to FIG. 3 and corresponds to the current lean angle value. FIG. 4 also shows the needle indicating the temperature of the tyres 102 and the numerical indications of the temperature values of the tyres 102 and the lean angle.

With particular reference to FIG. 5, this shows the view of the display 22 in a second operating condition, which may be called "moderate left lean", where the safety device 1 detects the data from the first infrared sensor 30 and from the second infrared sensor 31 and from the gyroscope 16.

The display 22 shows the needle 70 which indicates the lean angle in real time, i.e. 35°. FIG. 5 shows a white circular ring section S1, a green circular ring section S2, and part of a yellow circular ring S3.

From this graphical display the motorcyclist immediately understands that, with the current temperature value of the tyres, i.e. 90° C., the current lean angle decreases the degree of safety to a level which is still acceptable but closer to the critical values than the configuration of FIG. 4.

In the second operating condition shown in FIG. 5, the position of the negative artificial horizon has further changed with respect to FIG. 4 and corresponds to the current lean angle value. The needle indicating the temperature of the tyres 102 and the numerical indications of the temperature values of the tyres 102 are unchanged compared to the operating condition shown in FIG. 4.

With particular reference to FIG. 6, this shows the view of the display 22 in a third operating condition, which may be called "accentuated left lean", where the safety device 1 detects the data from the infrared sensors 30, 31 and from the gyroscope 16. The display 22 shows the needle 70 which indicates the lean angle in real time, i.e. 47°. FIG. 6 shows a white circular ring section S1, a green circular ring section S2, a yellow circular ring section S3, an orange circular ring section S4 and part of a dark orange circular ring section S5.

From this graphical display the motorcyclist understands immediately that, with the current temperature value of the tyres, i.e. 90° C., the current lean angle reduces the degree of safety, even though the risk of the motorcycle slipping is still within the limits.

In the third operating condition shown in FIG. 6 the position of the negative artificial horizon has changed further with respect to FIG. 5 and corresponds to the current lean angle value. The needle indicating the temperature of the tyres and the numerical indications of the temperature values of the tyres are unchanged compared to the operating condition shown in FIG. 5.

Figure 8:
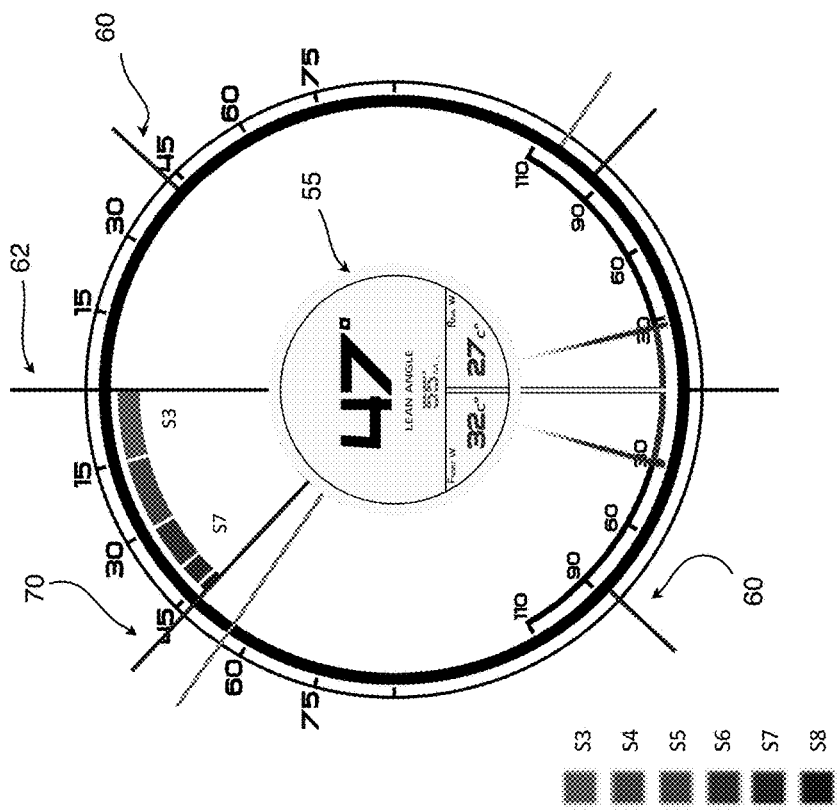
FIG. 8 is a view of the display of the device according to the present invention in a fifth operating condition.
Figure 7:
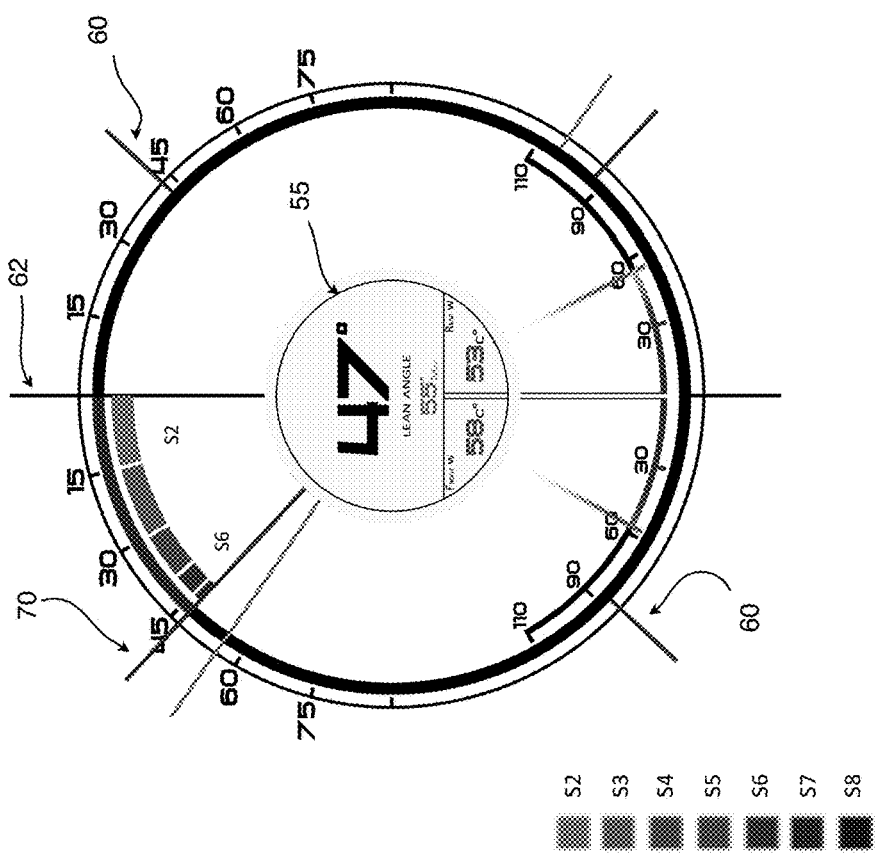
FIG. 7 is a view of the display of the device according to the present invention in a fourth operating condition.
Figure 9:
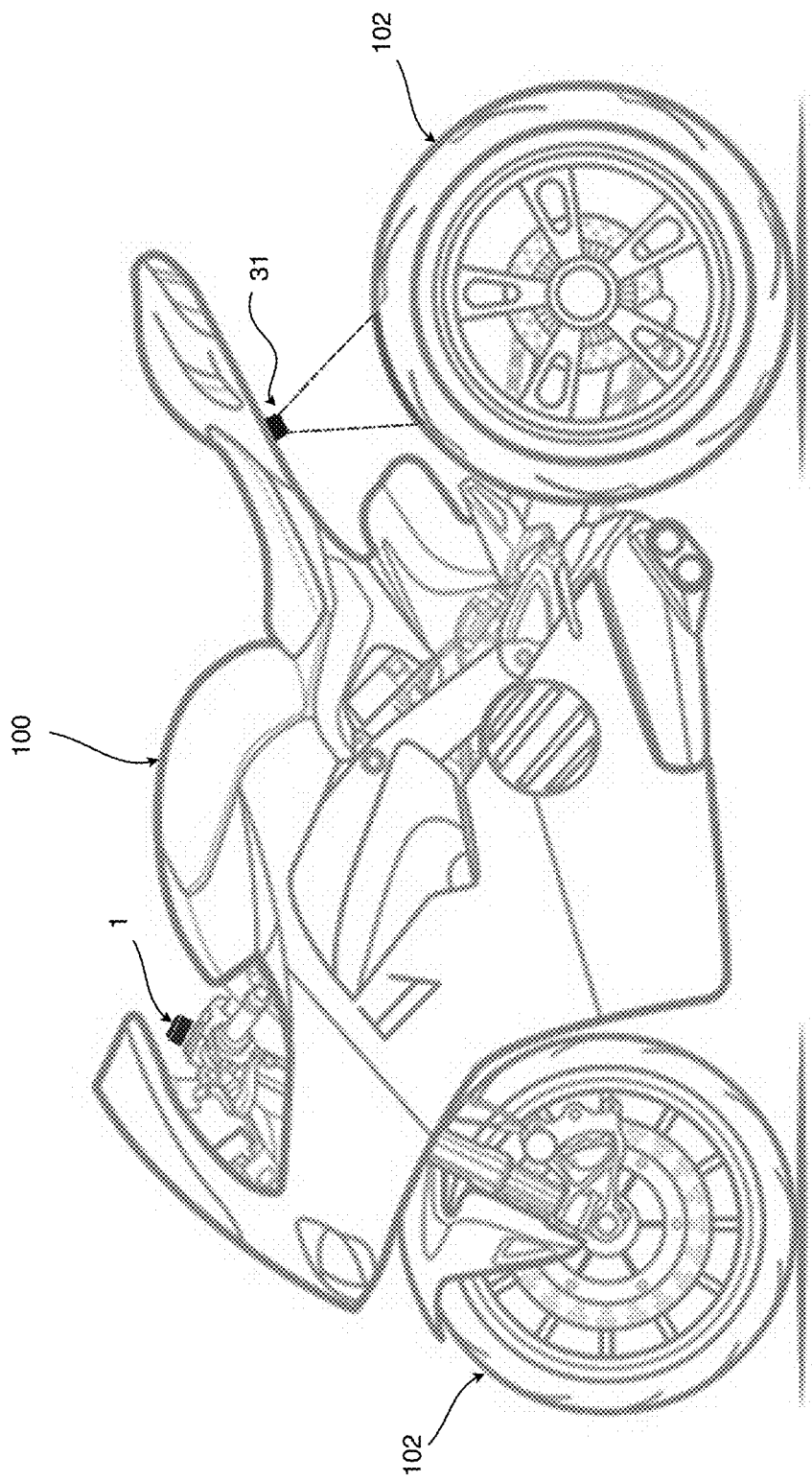
FIG. 9 is a schematic side view of a motorcycle in which the safety device according to the present invention is provided.

FIGS. 7 and 8 show views of the display 22 in two other operating conditions where the safety device 1 detects the data from the infrared sensors 30, 31 and from the gyroscope 16. In this case, however, certain conditions are shown where the lean angle of the motorcycle 100 detected is substantially constant, i.e. 47□, while the temperature value of the tyres 102 assumes two different values, 58° C. and 32° C. A comparison between FIGS. 6, 7 and 8—where in FIG. 6 the lean angle was the same, 47□, but the temperature of tyre detected was 90° C., i.e. the optimum temperature— helps illustrate better the description which follows.

With particular reference to FIG. 7, this shows a view of the display 22 in a fourth operating condition, which may be called "intermediate tyre temperature", where the safety device 1 detects the data from the sensor 33 and from the gyroscope. The display 22 shows the needle 70 which indicates the lean angle in real time, i.e. 47□, as in FIG. 6, while the needle indicating the temperature of the tyres 102 and the numerical indications of the temperature values of the tyres 102 have changed and indicate 58° C.

In this case, the green circular ring section S2, the yellow circular ring section S3, the orange circular ring section S4, the dark orange circular section S5 and also a portion of the red circular section S6 are shown. The safety levels Sn are therefore shifted with respect to the lean angle ranges (LAR): for example, the range 160-30° is no longer associated with the level S2, as indicated in the table shown above, but instead already the preceding range 0°-15□ is associated with it, and so on for the following ranges.

From this graphical display the motorcyclist understands immediately that, with the current temperature value of the tyre, i.e. 58° C., the current lean angle reduces even further the degree of safety, than in the operating condition of FIG. 6, with an average risk of slipping occurring, and that there is an alert situation, so much so that is advisable to increase the level of attention paid to the current lean angle of the motorcycle.

With particular reference to FIG. 8, this shows the view of the display 22 in a fifth operating condition, which may be called "critical tyre temperature", where the safety device 1 detects the data from the infrared sensors 30, 31 and the gyroscope 16. The display 22 shows the needle 70 which indicates the lean angle in real time, i.e. 47□, as in FIGS. 6 and 7, while the needle indicating the temperature of the tyres 102 and the numerical indications of the temperature value of the tyres 102 have changed and indicate 32° C.

In this case, the yellow circular ring section S3, the orange circular ring section S4, the dark orange circular ring section S5, the red circular section S6 and also a portion of the purple circular section S7 are shown. In this case also the safety levels Sn are shifted with respect to the lean angle ranges (LAR): for example, the range 31°-40° is no longer associated with the level S3, as indicated in the table shown above, but instead the range 0°-15□ is associated with it, and so on for the following ranges.

From this graphical display the motorcyclist immediately understands that with the current temperature value of the tyres 102, i.e. 32° C., the current lean angle reduces further the safety level, resulting in a high risk of slipping, and that a danger situation exists, this making a fall very likely, it being advisable to reduce immediately the lean angle and/or speed of the motorcycle.

According to other embodiments, the distance between the angle of inclination of the motorbike 100 detected by the gyroscope 16 and the extremes of the LARs is signalled to the motorcyclist by a sound signal, with or without a graphic representation on the display 22. For example, sound signals of different intensity or frequency may be produced depending on whether the angle of inclination of the motorbike 100 detected by the gyroscope 16 is more or less close to the extremes of the LARs range.

According to a further embodiment of the present invention, the microprocessor comprises a memory in which it is possible to store, via the USB port 25, a number of predetermined parameters relating to the type of tyre or both tyres used on the motorcycle 100. For example, it is possible to store the optimum working temperature range of the tyre 102. These values may therefore be regarded as reference values for associating a safety value (Sn) with respective lean angle ranges. Normally, a high-performance tyre used in a sporting environment has a temperature range of between 70° C. and 105° C., namely the tyre 102, in optimum pressure conditions if the average temperature lies within this range, will provide an excellent technical performance, ensuring a suitable grip allowing riding in relatively safe conditions with good lean angles.

If the detected temperature values of the tyre 102 are not optimum, the safety device 1 according to the present invention will "intelligently" choose on the display the circular ring sections relating to the degree of safety depending on the circumstances, for example an "Alert" display level, as in FIG. 7, or even "Danger" display level, as shown in FIG. 8.

According to a further embodiment of the present invention, the safety device 1 also comprises a GPS system with an integrated memory (not shown) connected to the microprocessor of the printed circuit 23.

Owing to this feature, the safety device is able to record data which relates to the geographical position of the motorcycle 100 and which can be associated with data relating to the lean angle reached depending on the temperature. The telemetric "history" of a riding session, for example, may be thus displayed on another device, checking the real interaction between the temperature parameters of the tyres 102 and the performance achieved in terms of lean angle and therefore grip of the motorcycle.

According to a particularly advantageous characteristic feature of the present invention, the infrared sensors 30, 31 also detect environmental parameters such as an environmental temperature value.

The data detected and then sent to the microprocessor 14 is processed together with the data relating to the temperature of the tyres 102 and, if necessary, together with the predetermined parameters relating to the type of tyre 102 used on the motorcycle 100 and stored in the microprocessor 14.

The set of all telemetry parameters measured and processed, in fact, greatly influence the processing of the safety thresholds of the lean angle range (LAR) so that the rider has access to an extra instrument which may be consulted in order to manage and set his/her riding style without, however, ever neglecting the due attention, care and common sense which always remain fundamental for ensuring road safety.

According to another embodiment of the present invention, the safety device 1 further comprises a tyre pressure monitoring system (TPMS), or a tyre temperature and pressure monitoring system (TTPMS). The monitoring system (TPMS or TTPMS) is configured to be connected to a tyre 102, for example a tyre 102 already monitored by the infrared sensor 30 or to a different tyre 102. In use, the monitoring system is configured to be connected to the microprocessor 14 and allows the pressure and temperature values of the inner tube of the tyre 102 to be measured and transmitted to the microprocessor 14. The microprocessor 14 is configured to transmit the pressure and temperature values of the inner tube of the tyre 102 to the display 22 and allow such data to be displayed to the rider.

According to these embodiments, the microprocessor 14 is configured to determine, in real time, a safe lean angle range (LAR) based on the thermal conditions of the tyre 102, i.e. based on the value of the external temperature of the tyre 102 measured by the infrared sensor 30 and the value of the internal temperature and pressure of the tyre 102 measured by the TMPS. The TPMS or TTPMS may be wirelessly connected to the microprocessor 14, for example by BLE (Bluetooth Low Energy) technology, and may comprise an internal battery.

According to a further embodiment, the safety device 1 is connected to the electronic circuit of the motorcycle 100, and in particular to the CAN BUS, by means of a wired or wireless connection. In this way, the safety device 1 is able to receive further parameters relating to the motorcycle 100 and use them for association of a safety value (Sn) with respective lean angle ranges.

What is claimed is:

1. A passive safety device (1) for a motorcycle (100) comprises a gyroscope (16) configured to be engaged with a portion of the motorcycle (100) and to measure a lean angle assumed by the motorcycle (100), a microprocessor (14) connected to the gyroscope (16), and a display (22) connected to the microprocessor (14), the microprocessor (14), the gyroscope (16) and the display (22) being configured to be connected to an electric power source (12), characterized in that the safety device (1) also comprises an infrared sensor (30) connected to the microprocessor (14) and configured to measure a temperature value of a tyre (102) of the motorcycle (100), the microprocessor (14) being configured to determine one or more safety lean angle values of the motorcycle (100) according to the measured temperature value of the tyre (102), and to display on the display (22) the measured lean angle assumed by the motorcycle (100) and the determined one or more safety lean angle values of the motorcycle (100).

2. Passive safety device according to claim 1, characterized in that said infrared sensor (30), said gyroscope (16) and said microprocessor are arranged inside a container (10) configured to be engaged to a portion of the motorcycle (100).

3. Passive safety device according to claim 1, characterized in that it comprises a plurality of functional keys (24, 26, 28) connected to the microprocessor (14).

4. Passive safety device according to claim 1, characterized in that it comprises a connection port (25) configured to supply an electric power source (12) and/or to transmit data to and from the microprocessor (14).

5. Passive safety device according to claim 1, characterized in that it comprises a GPS system connected to the microprocessor (14).

6. Passive safety device according to claim 1, characterized in that it comprises a second infrared sensor (31) and a Bluetooth module (40) connected to the microprocessor (14) of the printed circuit (23) and configured to receive data from said second infrared sensor (31).

7. Passive safety device according to claim 6, characterized in that said second sensor (31) is configured to be engaged with a portion of the motorcycle (100) facing a rear tyre (102) of the motorcycle (100).

8. Passive safety device according to claim 1, characterized in that the display (22) shows data received from the microprocessor (12) by means of a graduated goniometric ring (50), which comprises two half-rings (51, 53), and shows safety lean angle ranges determined by the microprocessor (12) depending on the lean angle values of the motorcycle detected by the gyroscope (16) and temperature values of the motorcycle tyre measured by the sensor (30).

9. A method of displaying a safety lean angle of a motorcycle (100) implemented in a passive safety device (1) of a motorcycle (100) comprises the steps of: detecting a lean angle value of a motorcycle (100) by means of a gyroscope (14) arranged on the motorcycle (100), detecting a temperature value of at least one of the tyres (102) of the motorcycle (100) by means of a sensor (30) arranged on the motorcycle (100), determining one or more safety lean angle values of the motorcycle depending on the detected values from the sensor (30), and showing on a display (22) the angle of inclination assumed by the motorbike (100) and the determined one or more safety angle values.

* * * * *